March 8, 1932.  H. W. WEBB  1,848,982
UNREELING MECHANISM
Filed June 28, 1928
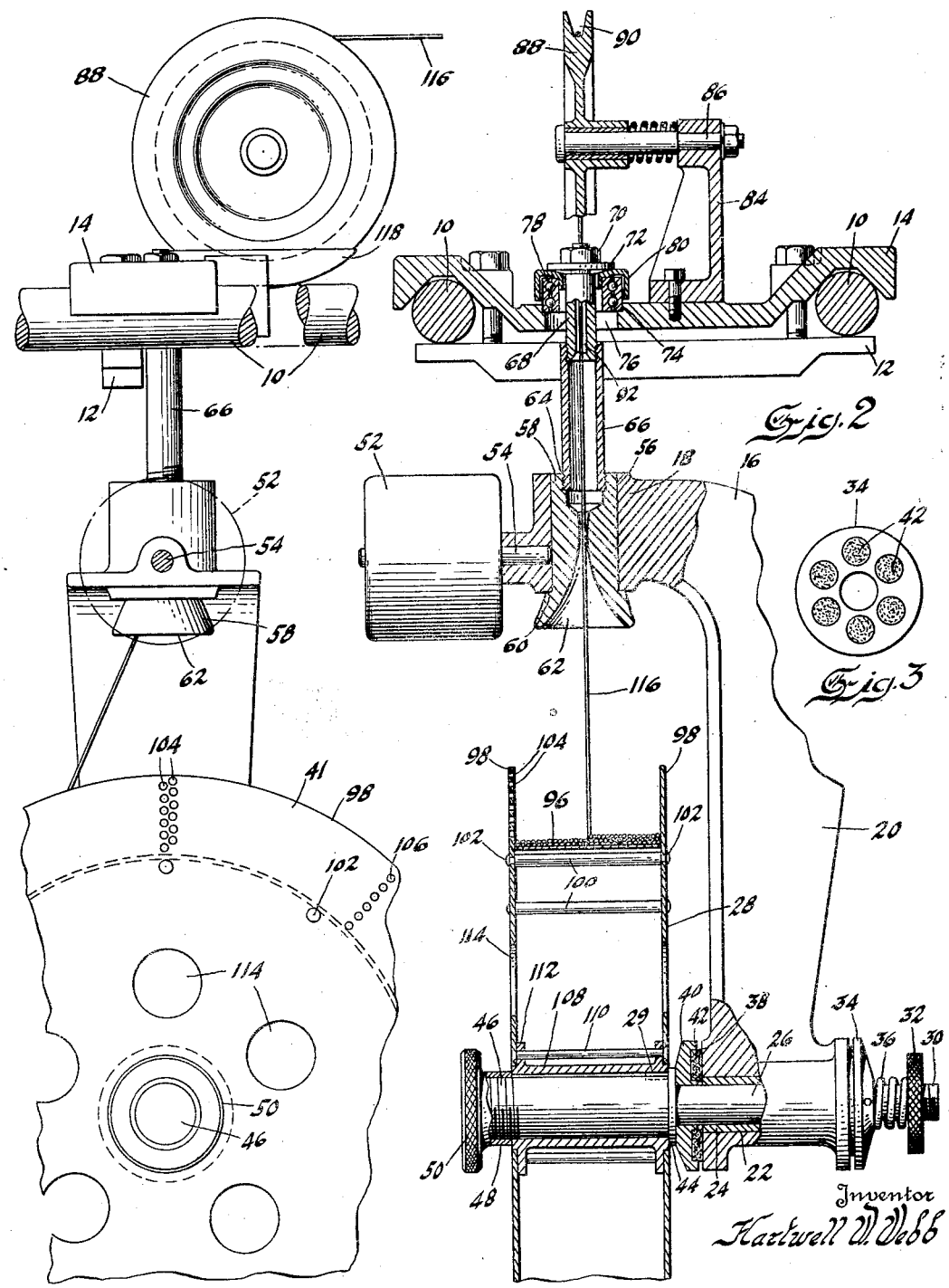

Patented Mar. 8, 1932

1,848,982

UNITED STATES PATENT OFFICE

HARTWELL W. WEBB, OF FLINT, MICHIGAN, ASSIGNOR TO A C SPARK PLUG COMPANY, OF FLINT, MICHIGAN, A COMPANY OF MICHIGAN

UNREELING MECHANISM

Application filed June 28, 1928. Serial No. 288,993.

This invention relates to unreeling or unwinding mechanisms, and has particular reference to a mechanism which is adapted for use with machines for making flexible cables or shafting.

The unwinding or unreeling mechanism comprises an L-shaped frame which has openings at the ends of the two legs of the L. At the lowermost opening there is mounted a rotatable shaft on which there is mounted a reel or spool containing the core wire for the cable winding machine. The specific form of reel comprises a central cylinder with two disc sides united by rods, the discs having a plurality of rows of radially arranged openings to hold the cable or wire ends.

In the opening of the other leg of the L-frame, there is rigidly mounted a plug having a conical bore. Secured in the plug in the end opposite the cone shaped bore is a tube connected at its outer end to a second tubular member which is swivelled to the frame, or to a plate of the cable winding machine. This swivelled connection comprises a horizontally positioned ball bearing through which the tubular member extends. Over the bearing there is positioned a cup-shaped washer to exclude dirt therefrom, and on the washer there bears a disc rigidly fastened to the end of the tubular member by means of a nut.

The wire from the reel suspended from the frame passes through the cone-shaped bore, the tubes and the roller bearing and over a guide pulley to the cable winding machine.

In the drawings:

Figure 1 is an elevational view of the unwinding mechanism connected to the frame or support for the cable winding machine.

Figure 2 is a view taken at right angles to Figure 1, with parts shown in section to illustrate the invention.

Figure 3 is a detail of one of the friction washers or tensioning discs.

Referring to the drawings, the numeral 10 indicates the side bars of the support or bed of a cable winding machine, to which bars there is rigidly secured the clamping bar 12 and clamping plate 14 which support the unreeling mechanism of the present invention.

The unreeling mechanism includes the inverted L-shaped frame 16, T-shaped in cross-section having the upper horizontal leg 18 and the lower vertical leg 20. The lower leg 20 is provided with a bore or opening 22 in which there is positioned a bushing 24 to serve as a bearing for a shaft 26 on which there is rigidly mounted the reel 28 by means of the short key and slot connection 29. The shaft end 30 extends beyond the opening 22 has a knurled nut 32 at its end and between the nut 32 and a friction disc or washer 34 there is positioned a coil spring 36 which serves as tensioning means and as a resilient thrust bearing for the shaft 26. As shown in Figure 3, the face of the disc adjacent the leg 20 has a plurality of recesses for the reception of felt pads 42 which create sufficient friction to require an appreciable force to rotate the reel or spool 28. This frictional resistance will prevent the reel from overrunning.

Between the reel 28 and the inner face 38 of the frame 16 there is positioned a second friction disc or washer 40 having the felt friction pads 42. The shaft 26 is provided with a flange 44 to properly position the reel 28 thereon, while the end 46 of the shaft is provided with a nut 48 having a knurled handle 50, the nut holding the reel 28 in position against the flange 44 on the shaft 26.

The horizontal leg 18 has applied thereto at its free end a weight 52 which is secured by means of a pin 54 to the leg end.

The leg 18 is also provided with an opening 56 in which there is secured the plug 58 provided with a shoulder 60 abutting the inner portion of the leg 18. The plug 58 is provided with a cone shaped bore 62 at its lower end, the upper end of the bore being substantially cylindrical.

Screw threaded into a recess 64 at the upper end of the plug 58 is a tube or pipe 66, the opposite end of which is internally threaded for the reception of the tubular member 68 to the opposite end of which there is secured by means of a nut 70, a washer or bearing disc 72.

Mounted on the clamping plate 14 of the support or frame of the cable winding machine in a recessed portion 74 of an opening 76 is a horizontally arranged ball bearing 78 over which there is seated the cup-shaped washer 80, the purpose of which is to exclude dust from the bearing and to serve as a seat for the washer or disc 72. The tubular member 68 extends through the bearing and the collar 72 rests on the washer 80 as is clearly shown in Figure 2.

Mounted on a bracket 84 secured to the support 14 is a shaft 86 to which there is secured a grooved sheave or pulley 88, the groove 90 of which is in alignment with the bore 92 in the tubular member 68. The sheave 88 has its lower portion surrounded by a pan 118 containing a suitable oil. As the core passes over the sheave it will take up a quantity of the lubricant, a desirable feature in forming flexible wire cables or shafting.

The reel 28 comprises the central cylindrical core 96 and the outer discs or sides 98. The parts are united by means of the rods 100, riveted over at their ends as shown at 102. As many of these rods as desired may be used. Each side 98 is provided with a plurality of rows 104 and 106 of openings the rows 104 comprising double rows of staggeredly arranged openings while the rows 106 are single. Ordinarily there are four rows 104 and four rows 106, the purpose of which is to secure the cable end by sticking it into one of the openings. The reel center is provided with a bearing 108 secured to the sides by means of rods 110 passing through a flange 112 on the bearing 108. Suitable openings 114 are provided in the reel sides.

From the construction as described and shown in Figure 2, it will be apparent that as the wire 116 unwinds from the reel 28 it will pass into the cone shaped bore 62 of the plug 58; through the tube 66 into the bore 92 of the tubular member 68 which rests on and extends through the ball bearing 78; and then over the sheave 88. The connection of the tubular member 68 with the support 14 through the intermediary of the horizontal ball bearing 78 will form a swivelled support for the frame 16 to permit of its free rotation about the axis of the bearing. The purpose of this freely rotatable construction is to allow the frame to assume any desired position to take care of the twist in the wire as it is unreeled from the spool 28.

I claim:

1. In an unwinding mechanism, an L-shaped frame, means for swivelly suspending said frame at one of its legs from a support, a reel suspended from the other leg of said frame, and means to allow the material from the reel to be guided by said suspending means and to pass through said frame and said first named means.

2. In an unwinding mechanism, an L-shape frame having openings in both its legs, a guiding plug in one opening said plug having a conical bore, a tube connected to said plug, means for swivelly suspending the opposite end of said tube from a support, a reel mounted on a shaft in the opening in the second leg, the material to be unwound from the reel passing through the conical bore, the tube and the swivelly suspending means.

3. In an unwinding mechanism, an L-shaped frame, means for swivelly suspending said frame at one of its legs from a support, a reel suspended from the other leg of said frame, and a passage in the first named means and frame to allow the material from the reel to pass through said frame and said first named means.

4. In an unwinding mechanism, an L-shaped frame, means for swivelly suspending said frame at one of its legs from a support comprising a ball bearing positioned on the support, a tube connected to the frame and passing through the bearing, and a disc on said tube suspended from the bearing, a reel suspended from the other leg of said frame, and means to allow the material from the reel to pass through said frame and said first named means.

5. In an unwinding mechanism, an L-shaped frame, a guiding plug mounted on one leg of said frame and having a bore, a tube rigidly mounted relative to said frame and plug, means for swivelly suspending the opposite end of said tube from a support, a reel mounted on a shaft mounted in the other leg of said frame, the material to be unwound from the reel passing through the bore, the tube and the swivelly suspending means.

6. In an unreeling mechanism, an L-shaped frame, means for rotatably suspending said frame from one of its legs from a support, means on the other leg of said frame for supporting a reel from which to unwind the reeled material, and a horizontally extending balancing weight on the upper end of the first-mentioned arm to balance said frame.

7. In an unreeling mechanism, an L-shaped frame, means for rotatably suspending said frame from one of its legs from a support, means on the other leg of said frame for supporting a reel from which to unwind the reeled material, and a balancing weight on the upper end of said frame secured on the end of and in alignment with the first-mentioned arm of the L to balance the frame.

8. In an unreeling mechanism for unreeling a cable or strand from a reel, a support, a ball-bearing for rotatably suspending said mechanism from said support, said mechanism including a frame, a reel rotatably mounted on said frame and having said cable or strand wound thereon, and means for frictionally retarding the rotation of the reel, said cable or strand passing through the ball-bearing when being unreeled.

9. In an unreeling mechanism for unreeling a cable or strand from a reel rotatably mounted on the mechanism, a bearing for pivotally mounting the mechanism on a support to allow it to rotate, a frame for mounting the reel, and tubular means interconnecting the frame and bearing, said strand or cable passing through said frame, tubular means and bearing in its passage from the reel.

In testimony whereof I affix my signature.

HARTWELL W. WEBB.